US008911030B2

(12) United States Patent
Ohnishi et al.

(10) Patent No.: US 8,911,030 B2
(45) Date of Patent: Dec. 16, 2014

(54) ELECTRIC BRAKE ACTUATOR AND VEHICLE BRAKE SYSTEM

(75) Inventors: Takaaki Ohnishi, Saitama (JP);
Kazuaki Murayama, Saitama (JP);
Hideo Miyabayashi, Tochigi (JP);
Nobuyuki Kobayashi, Tochigi (JP);
Yoshiyuki Takamatsu, Tochigi (JP);
Motoyasu Nakamura, Tochigi (JP);
Yoshiteru Matsunaga, Tochigi (JP)

(73) Assignees: Honda Motor Co., Ltd., Tokyo (JP);
Nissin Kogyo Co., Ltd., Nagano (JP)

( * ) Notice: Subject to any disclaimer, the term of this patent is extended or adjusted under 35 U.S.C. 154(b) by 193 days.

(21) Appl. No.: 13/297,606

(22) Filed: Nov. 16, 2011

(65) Prior Publication Data
US 2012/0119566 A1 May 17, 2012

(30) Foreign Application Priority Data

Nov. 17, 2010 (JP) .................. 2010-256421

(51) Int. Cl.
*B60T 13/74* (2006.01)
*B60T 7/04* (2006.01)
(52) U.S. Cl.
CPC ............ *B60T 13/745* (2013.01); *B60T 7/042* (2013.01)
USPC ................. 303/115.1; 303/114.1; 303/20
(58) Field of Classification Search
USPC .......... 303/113.1–113.4, 115.1–115.2, 117.1, 303/140, 20, 15–16, 85; 60/585, 581, 592; 188/114.1
See application file for complete search history.

(56) References Cited

U.S. PATENT DOCUMENTS

| 5,302,008 | A | * | 4/1994 | Miyake et al. ................ 303/14 |
| 5,836,659 | A | * | 11/1998 | Feigel et al. ............ 303/115.2 |
| 6,070,949 | A | | 6/2000 | Hariu et al. |
| 7,003,954 | B2 | * | 2/2006 | Ogiwara et al. ............... 60/568 |
| 2003/0213240 | A1 | * | 11/2003 | Nix et al. ..................... 60/588 |
| 2008/0256948 | A1 | | 10/2008 | Sato |

FOREIGN PATENT DOCUMENTS

| JP | 02-081265 U | 6/1990 |
| JP | 6-183330 A | 7/1994 |
| JP | 10-236375 A | 9/1998 |
| JP | 2007-015444 A | 1/2007 |
| JP | 2008-265561 A | 11/2008 |
| JP | 2010-023594 A | 2/2010 |

* cited by examiner

*Primary Examiner* — Anna Momper
(74) *Attorney, Agent, or Firm* — Carrier Blackman & Associates, P.C.; Joseph P. Carrier; William D. Blackman

(57) ABSTRACT

An electric brake actuator (motor cylinder apparatus) for generating hydraulic brake pressure on the basis of at least an electric signal corresponding to brake manipulation by an operator, which is incorporated in a vehicle brake system with an input apparatus being arranged separately from the electric brake actuator and receiving the brake manipulation. A reservoir reserving brake fluid is attached to a cylinder body included in the electric brake actuator, and the ceiling of the reservoir is inclined from the axis of the cylinder body in correspondence with an arrangement of the main body inclined from the horizontal line.

5 Claims, 10 Drawing Sheets

ELECTRIC BRAKE ACTUATOR AND VEHICLE BRAKE SYSTEM

CROSS-REFERENCE TO RELATED APPLICATIONS

This application claims the foreign priority benefit under 35 U.S.C. §119 of Japanese Patent Application No. 2010-256421, filed on Nov. 17, 2010, the disclosure of which is incorporated herein by reference.

BACKGROUND OF THE INVENTION

1. Field of the Invention

The present invention relates to an electric brake actuator incorporated in a vehicle brake system, and to the vehicle brake system.

2. Description of the Related Art

Conventionally, the brake boosters using the vacuum servo and the hydraulic booster are known as vehicle brake mechanisms. Recently, electric brake boosters which use an electric motor as a boosting power source have been disclosed, for example, in Japanese Patent Laid-open No. 2010-23594 (which is hereinafter referred to as JP 2010-23594A).

The electric brake booster disclosed in JP 2010-23594A is a single integrated apparatus having a main piston, a booster piston, and an electric motor. The main piston moves back and forth in response to manipulation of a brake pedal. The booster piston has a cylindrical shape, and is fit onto the main piston in such a manner that the booster piston can move relative to the main piston. The electric motor makes the booster piston move back and forth.

In the above electric brake booster, the main piston and the booster piston operate as pistons of the master cylinder, and the front ends of the main piston and the booster piston are inserted into a pressure chamber of the master cylinder, so that an input thrust applied to the main piston by the brake pedal and a booster thrust applied to the booster piston by the electric motor cause hydraulic brake pressure in the master cylinder.

However, the above electric brake booster disclosed in JP 2010-23594A tends to be large in size, and lacks versatility when the electric brake booster is mass produced.

The present invention has been developed in view of the above circumstances. The object of the present invention is to provide an electric brake actuator and a vehicle brake system having increased versatility.

SUMMARY OF THE INVENTION

In order to accomplish the above object, according to the first aspect of the present invention, an electric brake actuator for generating hydraulic brake pressure on the basis of at least an electric signal corresponding to brake manipulation by an operator, which is incorporated in a vehicle brake system with an input apparatus being arranged separately from the electric brake actuator and receiving the brake manipulation, is provided. The electric brake actuator according to the first aspect of the present invention includes: a main body; and a reservoir being attached to the main body, having a ceiling, and reserving brake fluid. The ceiling of the reservoir is inclined from the axis of the main body in correspondence with an inclined arrangement of the main body with respect to a horizontal line.

In the electric brake actuator according to the first aspect of the present invention, the ceiling of the reservoir is inclined from the axis of the main body of the electric brake actuator in correspondence with an inclined arrangement of the main body with respect to a horizontal line. Therefore, when the electric brake actuator is mounted on a vehicle in such a manner that the axis of the main body of the electric brake actuator is inclined from the horizontal line, the air mixed (or contained) in the brake fluid is collected in an upper space in the inclined reservoir, so that the air in the brake fluid can be easily released. That is, it is possible to preferably perform bleeding of the brake fluid. Consequently, according to the first aspect of the present invention, the electric brake actuator can be easily used, so that the versatility is increased.

Preferably, the electric brake actuator according to the first aspect of the present invention may be further arranged as follows. That is, the main body of the electric brake actuator may include a cylinder body, one or more pistons moved along one or more hydraulic pressure chambers formed in the cylinder body and an electric motor energizing the one or more pistons, wherein a first end portion of the cylinder body along the axis of the cylinder body where the reservoir is attached is located at a higher elevation in a vertical up-down direction than a second end portion of the cylinder body where the electric motor is connected.

In the electric brake actuator having the above feature, the air mixed (or contained) in the brake fluid in the one or more hydraulic pressure chambers in the cylinder body can be collected in a space nearer to the first end in each of the one or more hydraulic pressure chambers. Therefore, the air can be easily released with small displacement (with short strokes) of the one or more pistons in the initial displacement stage.

In order to accomplish the aforementioned object, according to the second aspect of the present invention, an electric brake actuator for generating hydraulic brake pressure on the basis of at least an electric signal corresponding to brake manipulation by an operator, which is incorporated in a vehicle brake system with an input apparatus being arranged separately from the electric brake actuator and receiving the brake manipulation, is provided. The electric brake actuator according to the second aspect of the present invention includes: a main body including a cylinder body; and a reservoir being attached to the cylinder body and reserving brake fluid. The main body of the electric brake actuator is arranged in such a manner that the reservoir can be arranged at a plurality of predetermined rotational positions around the axis of the cylinder body.

In the electric brake actuator according to the second aspect of the present invention, the reservoir can be arranged at the plurality of predetermined rotational positions around the axis of the cylinder body. Therefore, the degree of freedom in layout can be increased. For example, it is possible to preferably cope with either of the left-hand drive arrangement and the right-hand drive arrangement of the vehicle, and improve the assemblability.

Preferably, the electric brake actuator according to the second aspect of the present invention may be further arranged as follows. That is, the main body of the electric brake actuator may further include an actuator housing which is detachably attached to the cylinder body, and the cylinder body can be attached to the actuator housing at a plurality of rotational positions around the axis of the cylinder body.

In the electric brake actuator having the above preferable feature, the cylinder body can be attached to the actuator housing at a plurality of rotational positions around the axis of the cylinder body. As a result, for example, the reservoir can be arranged in two approximately symmetrical rotational positions (e.g., the positions rotated anticlockwise and clockwise around the axis of the cylinder body), so that the space can be effectively used, and the versatility can be increased.

Further, in the case where a nipple is attached to the reservoir, and the reservoir is attached to the cylinder body in such a manner that the nipple is located on the top of the reservoir, it is possible to easily perform operations for piping connection to the nipple when the electric brake actuator is mounted on a vehicle.

In order to accomplish the aforementioned object, according to the third aspect of the present invention, a vehicle brake system is provided. The vehicle brake system includes: an input apparatus which receives brake manipulation by an operator; and an electric brake actuator which is arranged separately from the input apparatus and generates hydraulic brake pressure on the basis of at least an electric signal corresponding to the brake manipulation. The electric brake actuator extends along an axis and includes a main body, a reservoir having a ceiling and reserving brake fluid is attached to the main body of the electric brake actuator, and the ceiling of the reservoir is inclined from the axis of the main body in correspondence with an inclined arrangement of the main body with respect to a horizontal line.

The vehicle brake system according to the third aspect of the present invention includes an electric brake actuator which has increased versatility.

DETAILED DESCRIPTION OF THE PREFERRED EMBODIMENT

The embodiments of the present invention are explained below with reference to the accompanying drawings as needed. In addition, in the following explanations, identical or equivalent elements or constituents may be indicated by the same reference numbers through all the embodiments.

1. First Embodiment 1.1 Outline of Construction

Figure 1:
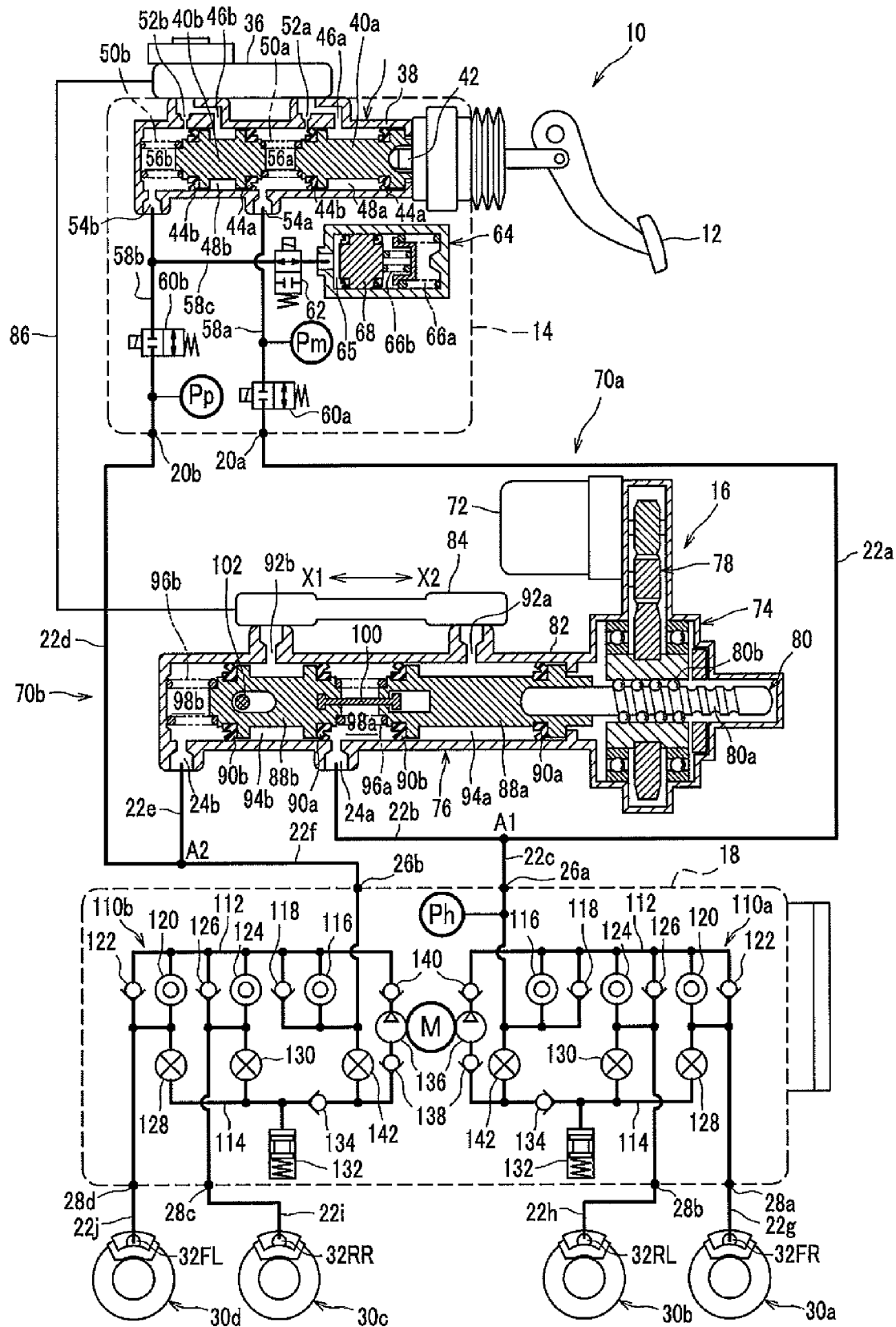
FIG. 1 is a diagram schematically illustrating a vehicle brake system in which a motor cylinder apparatus according to a first embodiment of the present invention is incorporated.

FIG. 1 schematically illustrates a vehicle brake system in which a motor cylinder apparatus according to a first embodiment of the present invention is incorporated.

The vehicle brake system 10 includes a brake-by-wire system for normal use and a conventional hydraulic braking system for fail-safe. The brake is operated by transmission of electric signals in the brake-by-wire system, and by hydrostatic transmission in the hydraulic braking system.

As illustrated in FIG. 1, the vehicle brake system 10 includes an input apparatus 14, a motor cylinder apparatus (electric brake actuator) 16, and a vehicle stability assist (VSA) apparatus 18. The input apparatus 14 is provided for receiving manipulation of a brake pedal 12 by an operator. The motor cylinder apparatus 16 controls the hydraulic brake pressure. The VSA® apparatus 18 is provided for assistance in stabilizing the vehicle handling. (VSA® is a registered trademark of Honda Motor Co.)

The input apparatus 14, the motor cylinder apparatus 16, and the VSA® apparatus 18 are connected through hydraulic paths of tubular materials such as hoses or tubes, and the input apparatus 14 and the motor cylinder apparatus 16 are electrically connected through wiring harness (not shown) so as to constitute the brake-by-wire system.

In the hydraulic paths, a connection port 20a in the input apparatus 14 is connected to a connection point A1 (as a reference point) through a first tube 22a, an outlet port 24a in the motor cylinder apparatus 16 is also connected to the connection point A1 through a second tube 22b, and an inlet port 26a in the VSA® apparatus 18 is connected to the connection point A1 through a third tube 22c.

In addition, another connection port 20b in the input apparatus 14 is connected to another connection point A2 (as another reference point) through a fourth tube 22d, another outlet port 24b in the motor cylinder apparatus 16 is also connected to the connection point A2 through a fifth tube 22e, and another inlet port 26b in the VSA® apparatus 18 is connected to the connection point A2 through a sixth tube 22f.

The VSA® apparatus 18 has a plurality of delivery ports 28a to 28d. The first delivery port 28a is connected through a seventh tube 22g to a wheel cylinder 32FR in a disk brake mechanism 30a in the right front wheel, the second delivery port 28b is connected through an eighth tube 22h to a wheel cylinder 32RL in a disk brake mechanism 30b in the left rear wheel, the third delivery port 28c is connected through a ninth tube 22i to a wheel cylinder 32RR in a disk brake mechanism 30c in the right rear wheel, and the fourth delivery port 28d is connected through a tenth tube 22j to a wheel cylinder 32FL in a disk brake mechanism 30d in the left front wheel.

In the above construction, the brake fluid is supplied to the wheel cylinders 32FR, 32RL, 32RR, and 32FL in the disk brake mechanisms 30a to 30d through the seventh to tenth tubes 22g to 22j connected to the delivery ports 28a to 28d, respectively. Therefore, when the hydraulic pressure in the wheel cylinders 32FR, 32RL, 32RR, and 32FL rise, the wheel cylinders 32FR, 32RL, 32RR, and 32FL operate, and exert braking force on the respectively corresponding wheels (i.e., the right front wheel, the left rear wheel, the right rear wheel, and the left front wheel).

The vehicle brake system 10 is arranged in such a manner that the vehicle brake system 10 can be mounted on each of the vehicles including the internal-combustion-engine vehicles, hybrid electric vehicles, electric vehicles, and fuel-cell vehicles.

1.2 Input Apparatus

The input apparatus 14 includes a master cylinder 34 and a first reservoir 36. The master cylinder 34 is a tandem type, and can generate hydraulic pressure in response to manipulation of the brake pedal 12 by the driver (operator), and the first reservoir 36 is attached to the master cylinder 34. The master cylinder 34 has a cylinder tube 38, in which two pistons 40a and 40b are arranged in such a manner that the two pistons 40a and 40b are a predetermined distance apart from each other and slidable along the direction of the cylinder tube 38. The one 40a of the two pistons is arranged nearer to the brake pedal 12, is connected to the brake pedal 12 through a pushrod 42, and is directly moved by the brake pedal 12 through the pushrod 42. The other 40b of the two pistons is arranged farther from the brake pedal 12 than the piston 40a.

In each of the pistons 40a and 40b, two annular shoulders are arranged on the outer surface of the piston, and a pair of packing rings 44a and 44b are fit around the outer surface of the piston at the annular shoulders, respectively. Thus, annular chambers 48a and 48b are realized between the two annular shoulders around the outer surfaces of the pistons 40a and 40b, respectively. The annular chambers 48a and 48b are respectively connected to supply ports 46a and 46b (which are explained later). In addition, a spring member 50a is arranged between the pistons 40a and 40b, and another spring member 50b is arranged between the piston 40b and a side end of the cylinder tube 38.

The two supply ports 46a and 46b, two relief ports 52a and 52b, and two outlet port 54a and 54b are arranged in the cylinder tube 38. In this arrangement, the supply port 46a and the relief port 52a join into one, and are connected to a reservoir chamber (not shown) in the first reservoir 36, and the supply port 46b and the relief port 52b also join into one, and are connected to the reservoir chamber.

Further, first and second pressure chambers 56a and 56b are realized in the cylinder tube 38 in the master cylinder 34. The hydraulic brake pressure corresponding to the leg power with which the brake pedal 12 is depressed by the driver is generated in the first and second pressure chambers 56a and 56b. The master cylinder 34 is arranged in such a manner that the first pressure chamber 56a is connected to the connection port 20a through a first hydraulic path 58b, and the second pressure chamber 56b is connected to the connection port 20a through a second hydraulic path 58b.

In the first hydraulic path 58a between the master cylinder 34 and the connection port 20a, a pressure sensor Pm is arranged on the upstream side, and a first shutoff valve 60a is arranged on the downstream side. The first shutoff valve 60a is realized by a normally-open solenoid valve. The pressure sensor Pm detects the hydraulic pressure on the master cylinder 34 side of the first shutoff valve 60a in the first hydraulic path 58a.

In addition, in the second hydraulic path 58b between the master cylinder 34 and the connection port 20b, a second shutoff valve 60b is arranged on the upstream side, and a pressure sensor Pp is arranged on the downstream side. The second shutoff valve 60b is realized by a normally-open solenoid valve. The pressure sensor Pp detects the hydraulic pressure on the downstream side of the second shutoff valve 60b in the second hydraulic path 58b. (The downstream side of the second shutoff valve 60b is the wheel cylinder side of the second shutoff valve 60b.)

The normally-open solenoid valves realizing the first and second shutoff valves 60a and 60b are valves in which the normal position of the valve element (i.e., the position of the valve element when the valves are unenergized) is open. (FIG. 1 shows a state in which the first and second shutoff valves 60a and 60b are energized, so that the first and second shutoff valves 60a and 60b are closed in FIG. 1.)

Further, a hydraulic branch path 58c branches from the part of the second hydraulic path 58b between the master cylinder 34 and the second shutoff valve 60b, and a third shutoff valve 62 and a stroke simulator 64 are connected in series to the hydraulic branch path 58c. The third shutoff valve 62 is realized by a normally-closed solenoid valve. The normally-closed solenoid valve realizing the third shutoff valve 62 is a valve in which the normal position of the valve element (i.e., the position of the valve element when the valve is unenergized) is closed. (FIG. 1 shows a state in which the third shutoff valve 62 is energized, so that the third shutoff valve 62 is open in FIG. 1.)

This stroke simulator 64 generates a brake stroke and reaction force during the break-by-wire control for making the driver feel as if the braking force were directly generated by the leg power. The stroke simulator 64 is arranged between the master cylinder 34 and the second shutoff valve 60b on the second hydraulic path 58b. A hydraulic pressure chamber 65, which is connected to the hydraulic branch path 58c, is arranged in the stroke simulator 64 in such a manner that the brake fluid delivered from the second pressure chamber 56b can be absorbed through the hydraulic pressure chamber 65.

In addition, the stroke simulator 64 includes first and second return springs 66a and 66b and a simulator piston 68. The first and second return springs 66a and 66b are arranged in series, and the simulator piston 68 is energized by the first and second return springs 66a and 66b. The spring constant of the first return spring 66a is great, and the spring constant of the second return spring 66b is small. The first and second return springs 66a and 66b and the simulator piston 68 are arranged in such a manner that the increase rate of the pedal reaction force is low in the beginning stage of depression of the brake pedal 12, and the pedal reaction force becomes strong in the later stage of the depression of the brake pedal 12, i.e., the driver feels a pedal feeling equivalent to the conventional master cylinder.

1.3 Hydraulic Circuits

The hydraulic paths can be roughly divided into first and second hydraulic circuits 70a and 70b. The first hydraulic circuit 70a connects the first pressure chamber 56a in the master cylinder 34 to the wheel cylinders 32FR and 32RL, and the second hydraulic circuit 70b connects the second pressure chamber 56b in the master cylinder 34 to the wheel cylinders 32RR and 32FL.

The first hydraulic circuit 70a is constituted by the first hydraulic path 58a (connecting the outlet port 54a of the master cylinder 34 (i.e., the outlet port 54a of the cylinder tube 38) to the connection port 20a in the input apparatus 14), the first and second tubes 22a and 22b (connecting the connection port 20a of the input apparatus 14 to the outlet port 24a of the motor cylinder apparatus 16), the second and third tubes 22b and 22c (connecting the outlet port 24a of the motor cylinder apparatus 16 to the inlet port 26a of the VSA® apparatus 18), and the seventh and eighth tubes 22g and 22h (connecting the first and second delivery ports 28a and 28b of the VSA® apparatus 18 to the wheel cylinders 32FR and 32RL, respectively).

The second hydraulic circuit 70b is constituted by the second hydraulic path 58b (connecting the outlet port 54b of the master cylinder 34 (i.e., the outlet port 54b of the cylinder tube 38) to the connection port 20b in the input apparatus 14), the fourth and fifth tubes 22d and 22e (connecting the connection port 20b of the input apparatus 14 to the outlet port 24b of the motor cylinder apparatus 16), the fifth and sixth tubes 22e and 22f (connecting the outlet port 24b of the motor cylinder apparatus 16 to the inlet port 26b of the VSA® apparatus 18), and the ninth and tenth tubes 22i and 22j (connecting the third and fourth delivery ports 28c and 28d of the VSA® apparatus 18 to the wheel cylinders 32RR and 32FL, respectively).

Since the hydraulic paths are constituted by the first and second hydraulic circuits 70a and 70b, it is possible to independently operate the pair of the wheel cylinders 32FR and 32RL and the pair of the wheel cylinders 32RR and 32FL, and independently generate the braking force in the pair of the wheel cylinders 32FR and 32RL and the pair of the wheel cylinders 32RR and 32FL.

1.4 Motor Cylinder Apparatus

Figure 2:
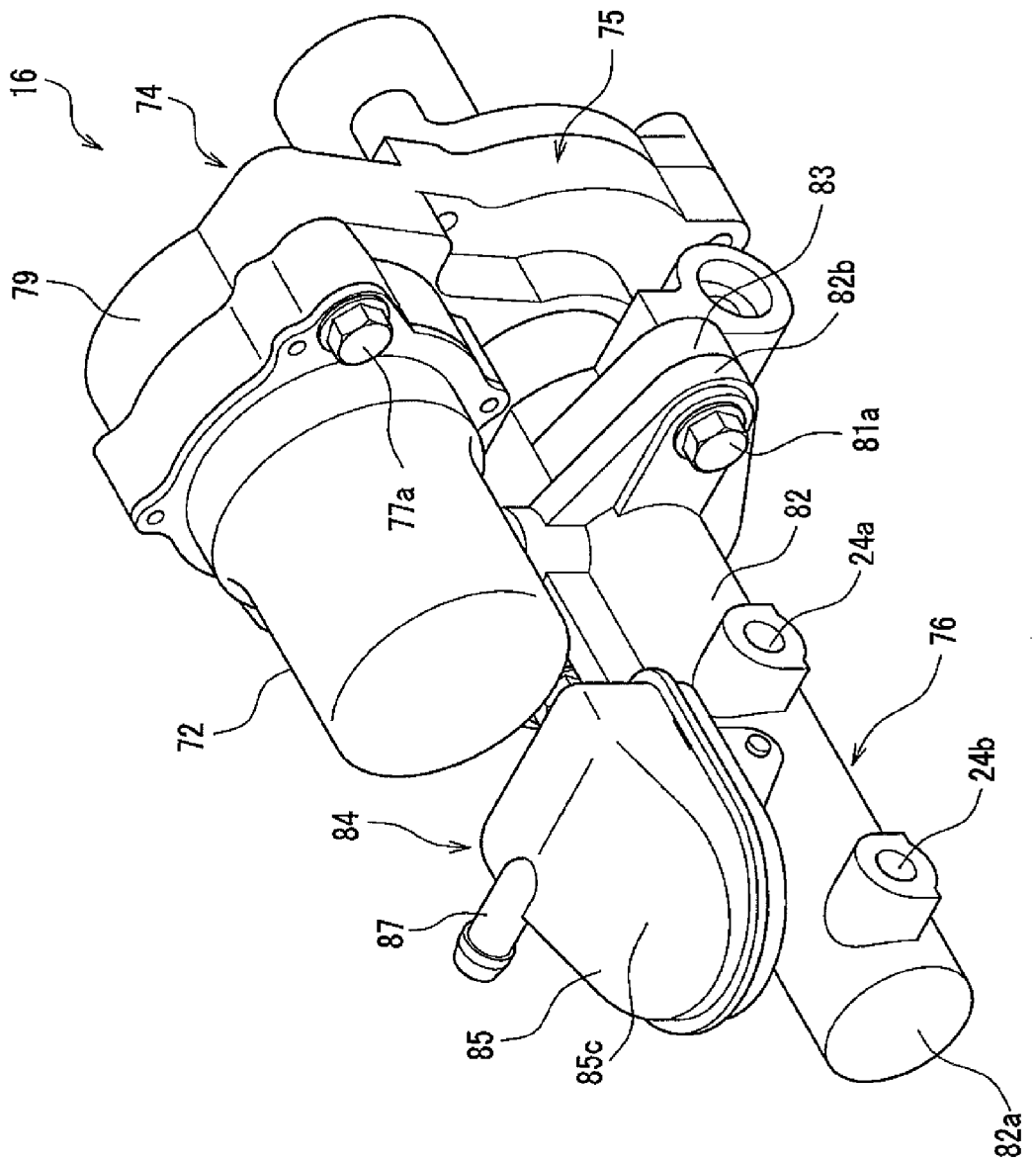
FIG. 2 is a perspective view of the motor cylinder apparatus illustrated in FIG. 1.
Figure 3:
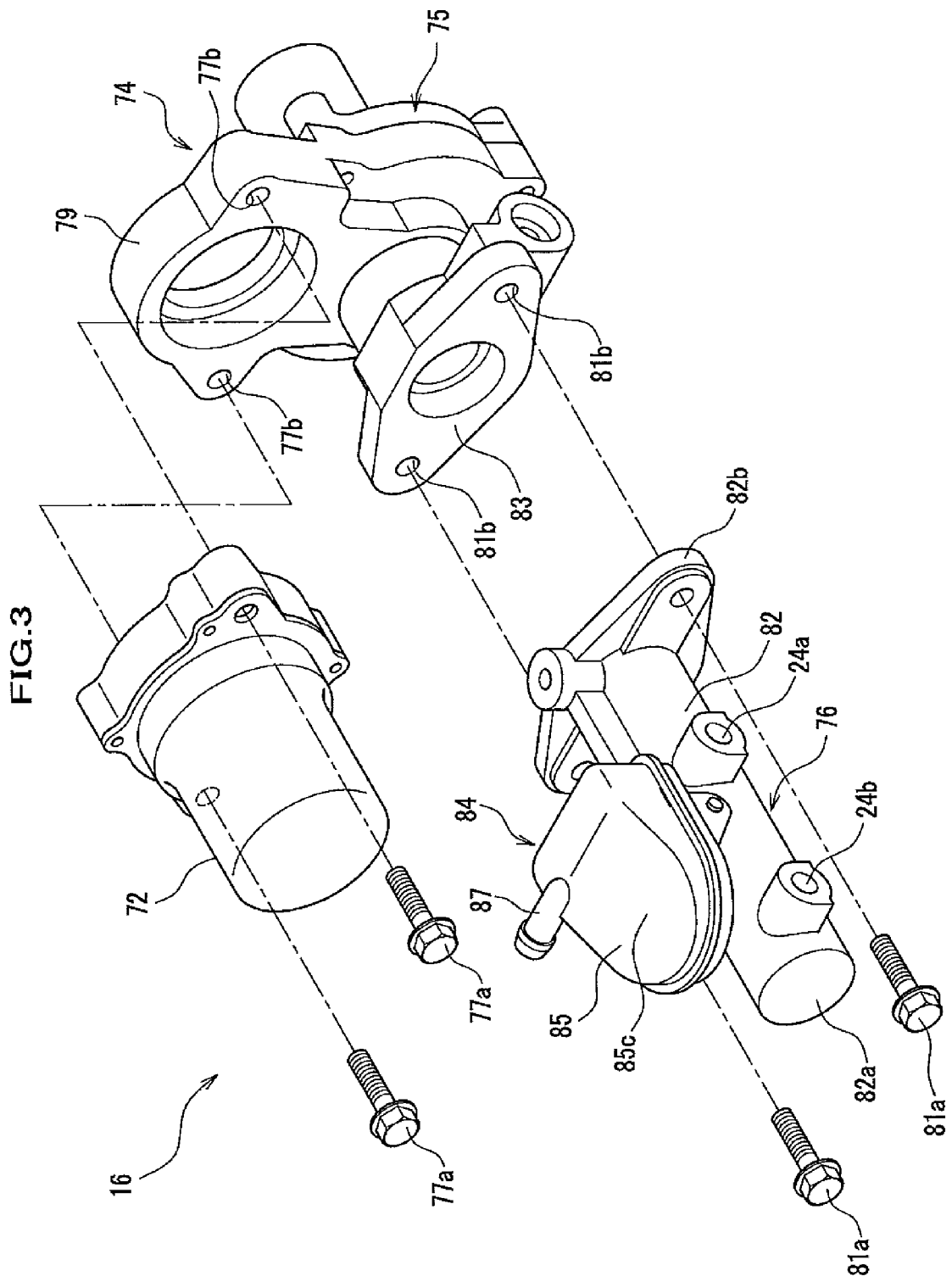
FIG. 3 is an exploded perspective view of the motor cylinder apparatus illustrated in FIG. 1.
Figure 4:
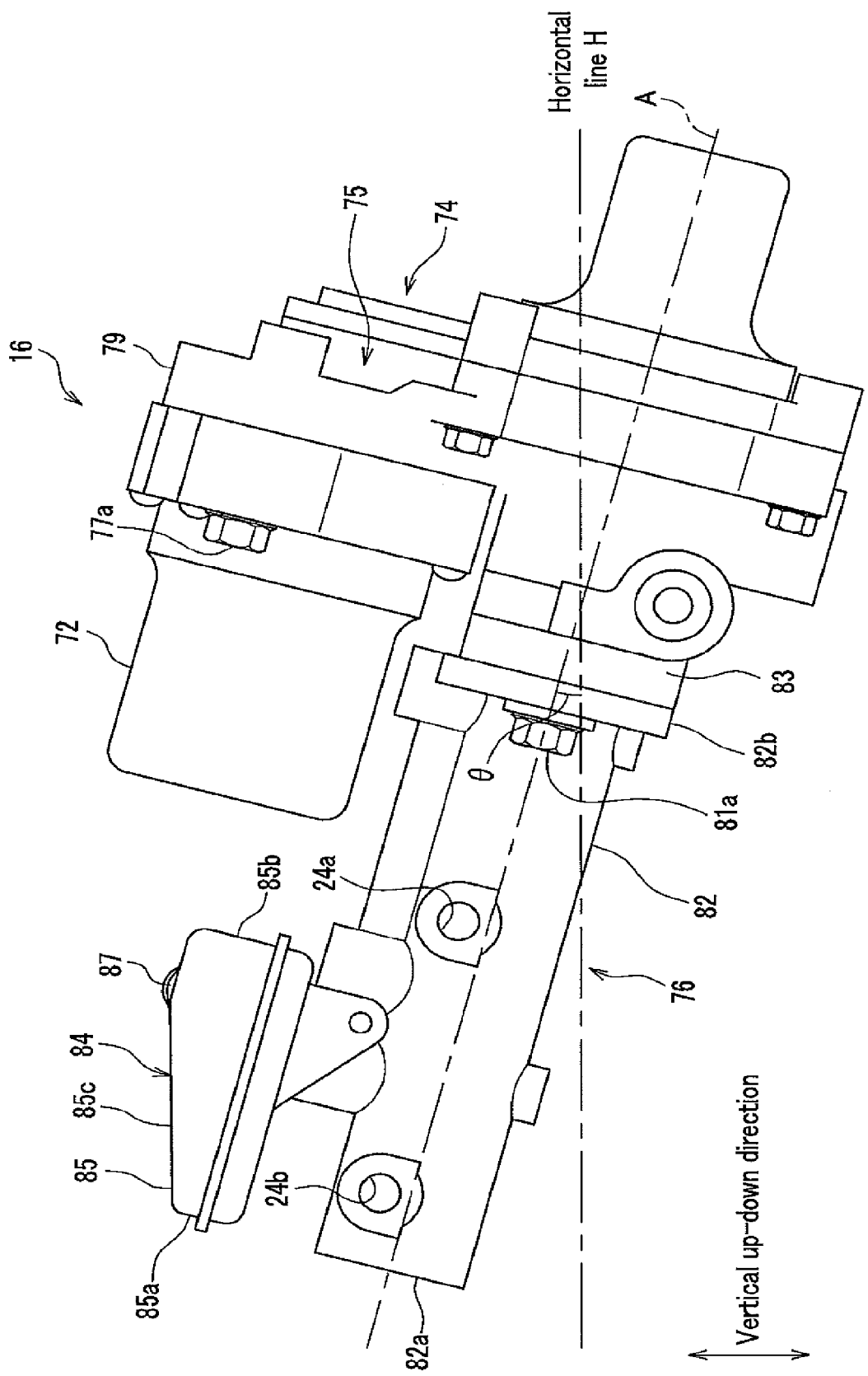
FIG. 4 is a side view of the motor cylinder apparatus of FIG. 1 placed in an inclined arrangement.
Figure 5:
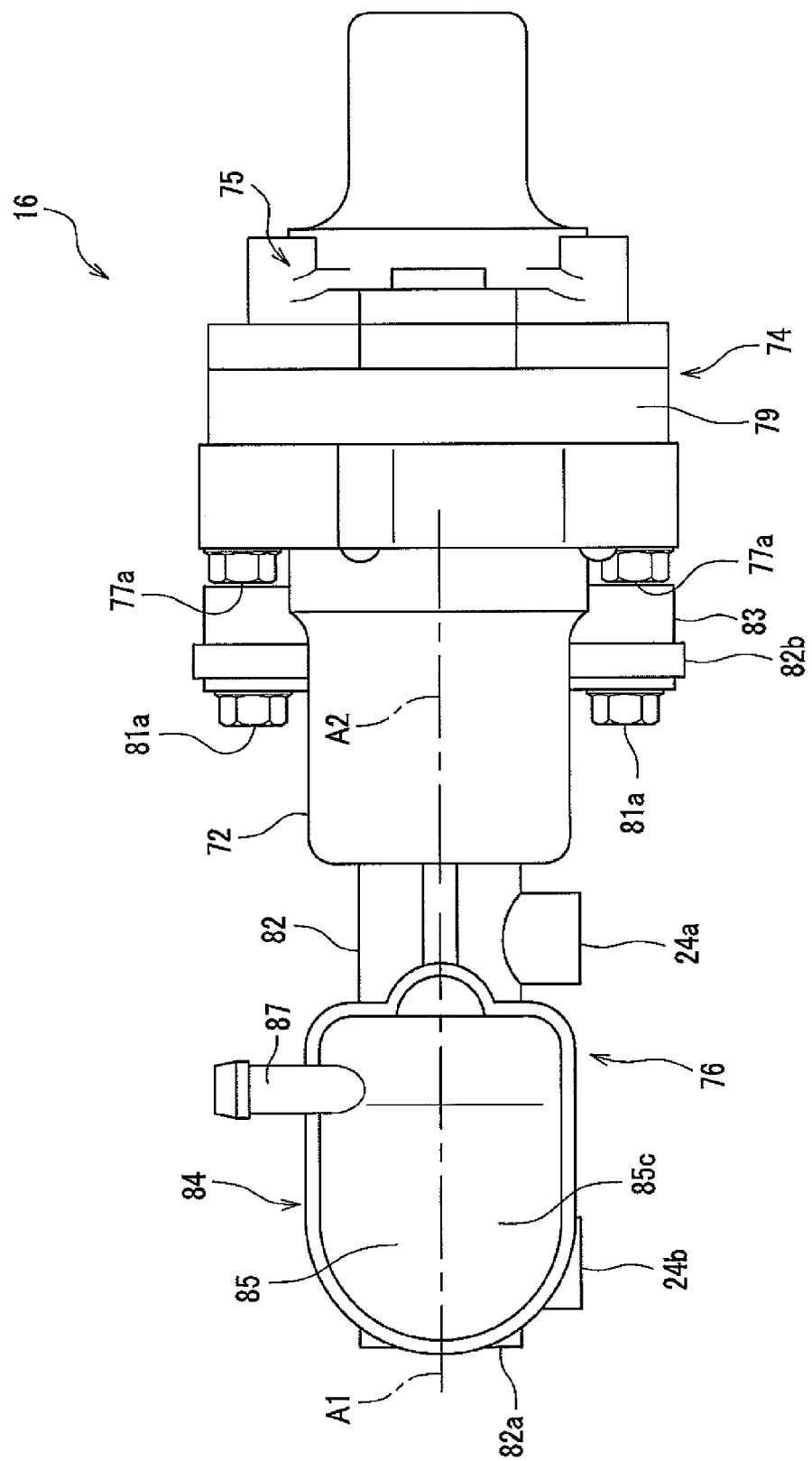
FIG. 5 is a plan view of the motor cylinder apparatus of FIG. 1.

FIG. 2 is a perspective view of the motor cylinder apparatus 16 illustrated in FIG. 1, FIG. 3 is an exploded perspective view of the motor cylinder apparatus illustrated in FIG. 1, FIG. 4 is a side view of the motor cylinder apparatus of FIG. 1 placed in an inclined arrangement, and FIG. 5 is a top view of the motor cylinder apparatus of FIG. 1.

The motor cylinder apparatus 16, which performs the function of the electric brake actuator, includes an actuator mechanism 74 and a cylinder mechanism 76 as illustrated in FIG. 2. The actuator mechanism 74 contains an electric motor 72, and the cylinder mechanism 76 is energized by the actuator mechanism 74.

As illustrated in FIG. 3, the actuator mechanism 74 includes an actuator housing 75, which includes an attachment part 79 and a flange 83. The electric motor 72 is attached to the attachment part 79 by tightening a pair of screw members 77a in a pair of screw holes 77b. In addition, the flange 82b at an end of the cylinder body 82 in the motor cylinder apparatus 16, which has an approximately rhombic shape, is attached to the flange 83 by tightening a pair of screw members 81a in a pair of screw holes 81b through the holes in the flange 82b.

In addition, as illustrated in FIG. 1, the actuator housing 75 contains a gear mechanism (deceleration mechanism) 78 and a ball screw structure 80. The gear mechanism 78 has a plurality of gears, is arranged on the output shaft side of the electric motor 72, and transmits the rotational driving force of the electric motor 72 by gear engagement. The ball screw structure 80 is constituted by a ball screw shaft 80a and balls 80b. The rotational driving force is transmitted to the ball screw structure 80 through the gear mechanism 78, and the ball screw shaft 80a moves back and forth along the axis of the shaft according to the transmitted rotational driving force.

The cylinder mechanism 76 includes the cylinder body 82 and a second reservoir 84. The cylinder body 82 has an approximately cylindrical shape, and the second reservoir 84 is directly attached to the outer surface of the cylinder body 82. The cylinder body 82 is arranged in such a manner that the cylinder body 82 can be separated from the actuator housing 75. The main body of the electric brake actuator is constituted by the actuator housing 75 and the cylinder body 82. The second reservoir 84 corresponds to the aforementioned reservoir in the electric brake actuators according to the first and second aspects of the present invention.

Since the second reservoir 84, which is directly attached to the cylinder body 82 in the motor cylinder apparatus 16, is provided, it is possible to secure an amount of brake fluid which is necessary and sufficient in the cylinder body 82. The second reservoir 84 is connected through a tube 86 to the first reservoir 36, which is attached to the master cylinder 34 in the input apparatus 14, so that the brake fluid reserved in the first reservoir 36 can be supplied to the second reservoir 84 through the tube 86.

The second reservoir 84 includes a reservoir body 85 and a nipple 87. The nipple 87 externally protrudes from the reservoir body 85. As illustrated in FIG. 4, the ceiling 85c of the reservoir body 85 is inclined by a predetermined angle θ from the axis A, which is in the length direction of the cylinder body 82. That is, for example, the third shutoff valve 62 is placed in such an inclined arrangement that one end 82a (the protruding end) of the cylinder body 82 is located at a slightly higher elevation than a horizontal line H (e.g., a horizontal line H passing through the center of gravity of the cylinder body 82), and the other end 82b of the cylinder body 82 is located at a slightly lower elevation than the horizontal line H. The outlet ports 24b and 24a are arranged in this order from a higher position along the inclined cylinder body 82.

Therefore, the reservoir body 85, which is attached to the cylinder body 82 in a position approximately parallel to the axis A of the cylinder body 82, is also placed in such an inclined arrangement that one end 85a of the axis of the reservoir body 85 is located at a slightly higher elevation than a horizontal line, and the other end 85b of the axis of the reservoir body 85 is located at a slightly lower elevation than the horizontal line. In the above arrangement in which the second reservoir 84 is attached to the cylinder body 82, the nipple 87 attached to the second reservoir 84 is located on the top of the second reservoir 84. Thus, when the motor cylinder apparatus 16 is mounted on a vehicle body, the nipple 87 can be located on the top of the second reservoir 84, so that operations for piping connection to the nipple 87 can be easily performed.

When the cylinder body 82 is placed in the above arrangement in which the front end 82a of the cylinder body 82 is slightly highly elevated compared with the other end 82b of the cylinder body 82, the air mixed (contained) in the brake fluid in each of the first and second hydraulic pressure chambers 98a and 98b in the cylinder body 82 is collected in a space nearer to the front end 82a of the cylinder body 82 in each of the first and second hydraulic pressure chambers 98a and 98b, so that the air comes out of the cylinder body 82 through the outlet ports 24b and 24a by initial displacements (in the initial stages of the strokes) of the first and second slave pistons 88a and 88b (which are explained later), and then the air is released from the wheel cylinders 32FR, 32RL, 32RR, and 32FL.

As illustrated in FIG. 4, according to the present embodiment, the motor cylinder apparatus 16 is arranged in such a manner that the ceiling 85c of the second reservoir 84 is inclined from the axis A of the cylinder body 82. Therefore, it is possible to preferably perform bleeding of the brake fluid in the cylinder body 82. Thus, it is possible to prevent accumulation of air in the first and second hydraulic pressure chambers 98a and 98b in the cylinder body 82, and preferably deliver to the wheel cylinders 32FR, 32RL, 32RR, and 32FL the brake fluid having the pressure which is controlled at a desired level in the first and second hydraulic pressure chambers 98a and 98b in the cylinder body 82.

Further, as mentioned before, the air mixed in the brake fluid in the cylinder body 82 is collected in the spaces nearer to the front end 82a (in the axis direction of the cylinder body 82) in the first and second hydraulic pressure chambers 98a and 98b, where the spaces are respectively near to the outlet ports 24a and 24b. Therefore, it is possible to easily release the air by a small amount of displacement (stroke) in the initial stage of the displacement of each of the first and second slave pistons 88a and 88b. Furthermore, during normal operation, the second reservoir 84 is filled with the brake fluid.

As illustrated in FIG. 5, in the present embodiment, the second reservoir 84 and the electric motor 72 are arranged in such a manner that the axis A1 of the reservoir body 85 and the axis A2 of the electric motor 72 approximately overlap in the plan view.

Referring back to FIG. 1, the first and second slave pistons 88a and 88b are slidably arranged in the cylinder body 82, where the first and second slave pistons 88a and 88b are separated by a predetermined distance from each other along the axial direction of the cylinder body 82. The first slave piston 88a is arranged close to the ball screw structure 80 in contact with an end of the ball screw shaft 80a, and moves together with the ball screw shaft 80a in the directions X1 and X2. The second slave piston 88b is arranged farther from the ball screw shaft 80a than the first slave piston 88a.

In each of the first and second slave pistons 88a and 88b, a pair of packing rings 90a and 90b are fit around the outer surface of each of the first and second slave pistons 88a and 88b. Thus, annular chambers 94a and 94b are realized between the pair of packing rings 90a and 90b around the outer surfaces of the first and second slave pistons 88a and 88b, respectively, where the annular chambers 94a and 94b are respectively connected to reservoir ports 92a and 92b (which are explained later). In addition, a first return spring 96a is arranged between the first and second slave pistons 88a and 88b, and a second return spring 96b is arranged between the second slave piston 88b and a side end of the cylinder body 82.

The two reservoir ports 92a and 92b and the two outlet ports 24a and 24b are arranged in the cylinder body 82 in the cylinder mechanism 76. In this case, the reservoir ports 92a and 92b are arranged to be connected to a reservoir chamber (not shown) in the second reservoir 84.

In addition, first and second hydraulic pressure chambers 98a and 98b are arranged in the cylinder body 82. The first hydraulic pressure chamber 98a controls the brake fluid pressure outputted from the outlet port 24a to the wheel cylinders 32FR and 32RL, and the second hydraulic pressure chamber 98b controls the brake fluid pressure outputted from the outlet port 24b to the wheel cylinders 32RR and 32FL.

A regulation means 100 which regulates the maximum and minimum displacements in strokes of the first and second slave pistons 88a and 88b is arranged between the first and second slave pistons 88a and 88b. In addition, a stopper pin 102 is arranged in the second slave piston 88b. The stopper pin 102 regulates the slidable range of the second slave piston 88b, and prevents overreturn of the second slave piston 88b toward the first slave piston 88a. Therefore, while the braking operation with the brake fluid pressure generated by the master cylinder 34 is backed up, it is possible to prevent concurrent occurrences of failures in both of the hydraulic circuits even when one of the hydraulic circuits fails.

1.5 VSA® Apparatus

The VSA® apparatus 18 includes first and second braking systems 110a and 110b. The first braking system 110a controls the first hydraulic circuit 70a connected to the disk brake mechanisms 30a and 30b (the wheel cylinders 32FR and 32RL) for the right front wheel and the left rear wheel, and the second braking system 110b controls the second hydraulic circuit 70b connected to the disk brake mechanisms 30c and 30d (the wheel cylinders 32RR and 32FL) for the right rear wheel and the left front wheel. Alternatively, the first braking system 110a may be constituted by hydraulic circuits connected to the disk brake mechanisms arranged for the right front wheel and the left front wheel, and the second braking system 110b may be constituted by hydraulic circuits connected to the disk brake mechanisms arranged for the right rear wheel and the left rear wheel. Further alternatively, the first braking system 110a may be constituted by hydraulic circuits connected to the disk brake mechanisms arranged for the right front wheel and the right rear wheel, and the second braking system 110b may be constituted by hydraulic circuits connected to the disk brake mechanisms arranged for the left front wheel and the left rear wheel.

Since the first and second braking systems 110a and 110b have identical structures, identical reference numbers are assigned to equivalent elements in the first and second braking systems 110a and 110b in FIG. 1. The following explanations are focused on the first braking system 110a, and the explanations on the second braking system 110b are indicated in parentheses.

The first braking system 110a (the second braking system 110b) includes first and second common hydraulic paths 112 and 114 which are common to the wheel cylinders 32FR and 32RL (32RR and 32FL). The VSA® apparatus 18 includes a regulator valve 16, first, second, and third check valves 118, 122, and 126, and first and second in-valves 120 and 124. The regulator valve 116 is realized by a normally-open solenoid valve, and arranged between the inlet port 26a and the first common hydraulic path 112. The first check valve 118 is arranged parallel with the above regulator valve 116. The first check valve 118 allows passage of the brake fluid from the inlet port 26a to the first common hydraulic path 112 (and stops passage of the brake fluid from the first common hydraulic path 112 to the inlet port 26a). The first in-valve 120 is realized by a normally-open solenoid valve, and arranged between the first common hydraulic path 112 and the first delivery port 28a. The second check valve 122 is arranged parallel with the above first in-valve 120. The second check valve 122 allows passage of the brake fluid from the first delivery port 28a to the first common hydraulic path 112 (and stops passage of the brake fluid from the first common hydraulic path 112 to the first delivery port 28a. The second in-valve 124 is realized by a normally-open solenoid valve, and arranged between the first common hydraulic path 112 and the second delivery port 28b. The third check valve 126 is arranged parallel with the above second in-valve 124. The third check valve 126 allows passage of the brake fluid from the second delivery port 28b to the first common hydraulic path 112 (and stops passage of the brake fluid from the first common hydraulic path 112 to the second delivery port 28b).

Further, the VSA® apparatus 18 includes first and second out-valves 128 and 130, a reservoir 132, a fourth check valve 134, a pump 136, a suction valve 138, a discharge valve 140, a motor M, and a suction valve 142. The first out-valve 128 is realized by a normally-closed solenoid valve, and arranged between the first delivery port 28a and the second common hydraulic path 114. The second out-valve 130 is realized by a normally-closed solenoid valve, and arranged between the second delivery port 28b and the second common hydraulic path 114. The reservoir 132 is connected to the second common hydraulic path 114. The fourth check valve 134 is arranged between the first common hydraulic path 112 and the second common hydraulic path 114. The fourth check valve 134 allows passage of the brake fluid from the second common hydraulic path 114 to the first common hydraulic path 112 (and stops passage of the brake fluid from the first common hydraulic path 112 to the second common hydraulic path 114). The pump 136 is arranged between the fourth check valve 134 and the first common hydraulic path 112, and supplies the brake fluid from the second common hydraulic path 114 to the first common hydraulic path 112. The suction valve 138 and the discharge valve 140 are respectively arranged on both sides of the pump 136. The motor M drives the pump 136. The suction valve 142 is realized by a normally-closed solenoid valve, and arranged between the second common hydraulic path 114 and the inlet port 26a.

Furthermore, a pressure sensor Ph is arranged on the hydraulic path close to the inlet port 26a in the first braking system 110a, and detects the pressure of the brake fluid which is delivered from the outlet port 24a of the motor cylinder apparatus 16 and controlled in the first hydraulic pressure chamber 98a in the motor cylinder apparatus 16. Each of the pressure sensors Pm, Pp, and Ph generates a detection signal representing the detected pressure, and supplies the detection signal to a controller (not shown). The VSA® apparatus 18 also performs ABS (antilock brake system) control as well as the VSA® (vehicle stability assist) control.

1.6 Operations and Advantages

The vehicle brake system 10 in which the motor cylinder apparatus 16 according to the first embodiment is incorporated has the above construction, and operates as explained below.

During normal operation of the vehicle brake system 10, the first and second shutoff valves 60a and 60b (respectively realized by normally-open solenoid valves) are closed due to energization by electric power supply, and the third shutoff valve 62 (realized by a normally-closed solenoid valve) is open due to energization by electric power supply. Since the first and second hydraulic circuits 70a and 70b are closed, the hydraulic brake pressure generated in the master cylinder 34 in the input apparatus 14 is not transmitted to the wheel cylinders 32FR, 32RL, 32RR, and 32FL in the disk brake mechanisms 30a to 30d.

At this time, the hydraulic brake pressure generated in the second pressure chamber 56b in the master cylinder 34 is transmitted to the hydraulic pressure chamber 65 in the stroke simulator 64 through the hydraulic branch path 58c and the third shutoff valve 62 (which is open). The hydraulic brake pressure supplied to the hydraulic pressure chamber 65 makes the simulator piston 68 move against the spring force produced by the spring members 66a and 66b. Therefore, the brake pedal 12 is allowed to move, and the hydraulic brake pressure in the hydraulic pressure chamber 65 causes dummy pedal reaction force in the brake pedal 12, so that the driver can feel a normal brake feeling.

When the controller (not shown) detects depression of the brake pedal 12 by the driver in the above situation of the vehicle brake system 10, the controller activates the electric motor 72 in the motor cylinder apparatus 16, energizes the actuator mechanism 74, and causes displacement of the first and second slave pistons 88a and 88b toward the direction indicated by the arrow X1 in FIG. 1, against the spring force generated by the first and second return springs 96a and 96b. The displacement presses the brake fluid in the first and second hydraulic pressure chambers 98a and 98b so that the brake fluid in the first and second hydraulic pressure chambers 98a and 98b balances and generates a desired hydraulic brake pressure.

The hydraulic brake pressure generated in the first and second hydraulic pressure chambers 98a and 98b in the motor cylinder apparatus 16 is transmitted to the wheel cylinders 32FR, 32RL, 32RR, and 32FL in the disc brake mechanisms 30a to 30d through the first and second in-valves 120 and 124 in the VSA® apparatus 18, which are open. When the wheel cylinders 32FR, 32RL, 32RR, and 32FL operate, desired braking force is exerted on the respective wheels.

In other words, when the motor cylinder apparatus 16 having the function of a hydraulic power source, an ECU (engine control unit, not shown) performing the brake-by-wire control, and other functions of the vehicle brake system 10 can operate, the aforementioned brake-by-wire system becomes active. In the brake-by-wire system, the disc brake mechanisms 30a to 30d (having the wheel cylinders 32FR, 32RL, 32RR, and 32FL and controlling the respective wheels) are activated with the hydraulic brake pressure generated by the motor cylinder apparatus 16 in the situation in which the connections between the master cylinder 34 (generating the hydraulic brake pressure) and the disc brake mechanisms 30a to 30d are interrupted by the first and second shutoff valves 60a and 60b in response to depression of the brake pedal 12 by the driver. The present embodiment can be preferably applied to the vehicles (e.g., electric vehicles) which cannot use the negative pressure produced by the internal combustion engine (although such negative pressure has been conventionally used).

On the other hand, under abnormal conditions in which, for example, the motor cylinder apparatus 16 cannot operate, the first and second shutoff valves 60a and 60b are opened, and the third shutoff valve 62 is closed, so that the hydraulic brake pressure generated in the master cylinder 34 is transmitted to the disc brake mechanisms 30a to 30d (i.e., the wheel cylinders 32FR, 32RL, 32RR, and 32FL), and the disc brake mechanisms 30a to 30d (i.e., the wheel cylinders 32FR, 32RL, 32RR, and 32FL) are activated. That is, the conventional hydraulic brake system operates.

2. Second Embodiment

A motor cylinder apparatus according to the second embodiment of the present invention is explained below with reference to FIGS. 6 to 10. In the motor cylinder apparatus 16 according to the first embodiment, the second reservoir 84 and the electric motor 72 are arranged along an identical axis in a plan view, and approximately parallel to the axis of the cylinder body 82 as illustrated in FIGS. 2 and 5. On the other hand, the motor cylinder apparatus 150 according to the second embodiment is different from the first embodiment in that the second reservoir 152 is arranged in a position which is rotated around the axis A of the cylinder body 154 (or 170 in FIG. 9) by a predetermined angle, so that the axis A1 of the second reservoir 152 is parallel to the axis A2 of the electric motor 158, and apart from the axis A2 of the electric motor 158 by a predetermined distance. (as explained later with reference to FIG. 7).

In FIGS. 6 to 10, the same constituents as FIGS. 1 to 5 respectively bear the same reference numbers as FIGS. 1 to 5. The following explanations on the motor cylinder apparatus according to the second embodiment do not basically include the same explanations as the first embodiment, and are focused on the differences from the first embodiment in the construction, operations, and advantages.

Figure 6:
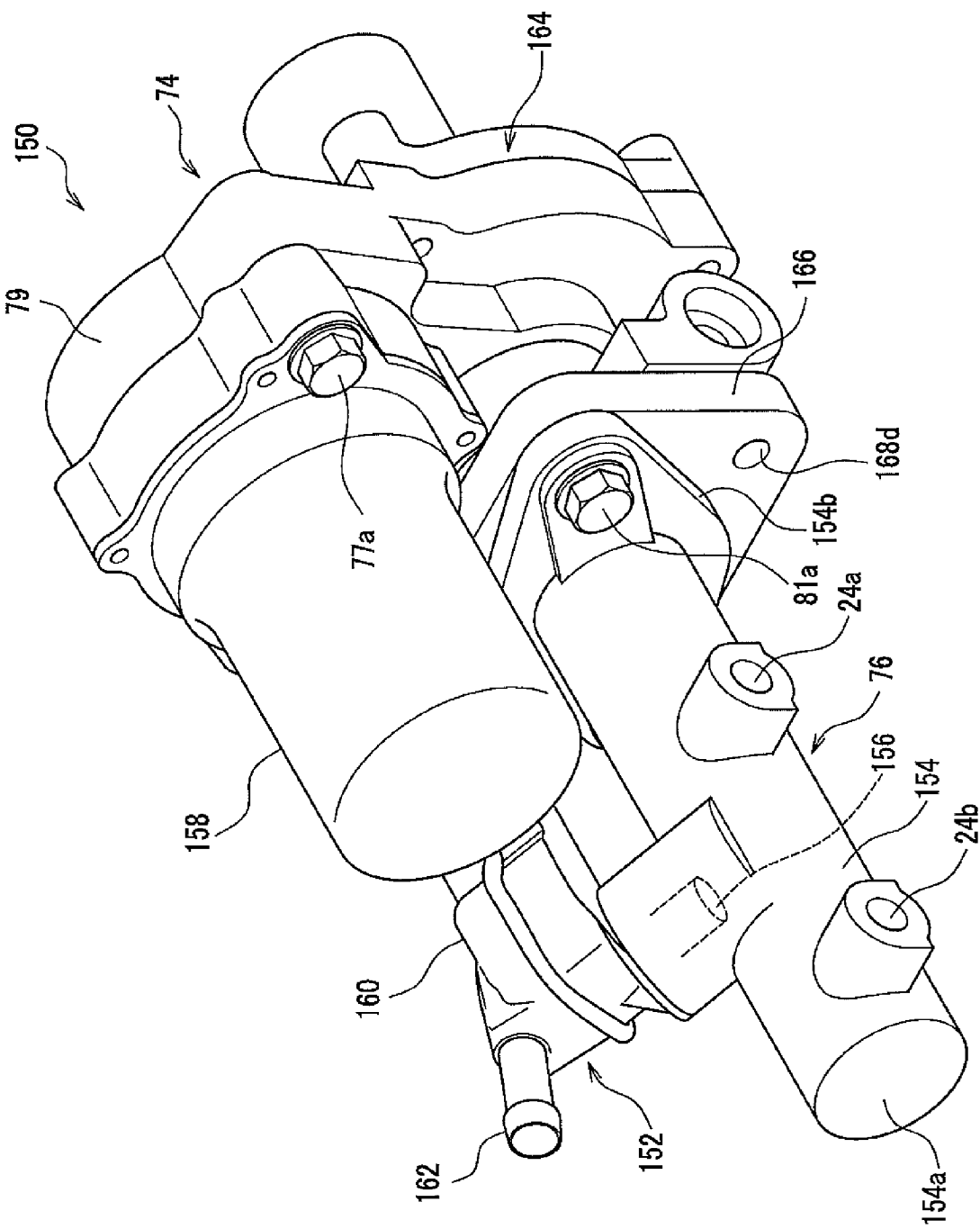
FIG. 6 is a perspective view of a motor cylinder apparatus according to a second embodiment of the present invention.
Figure 7:
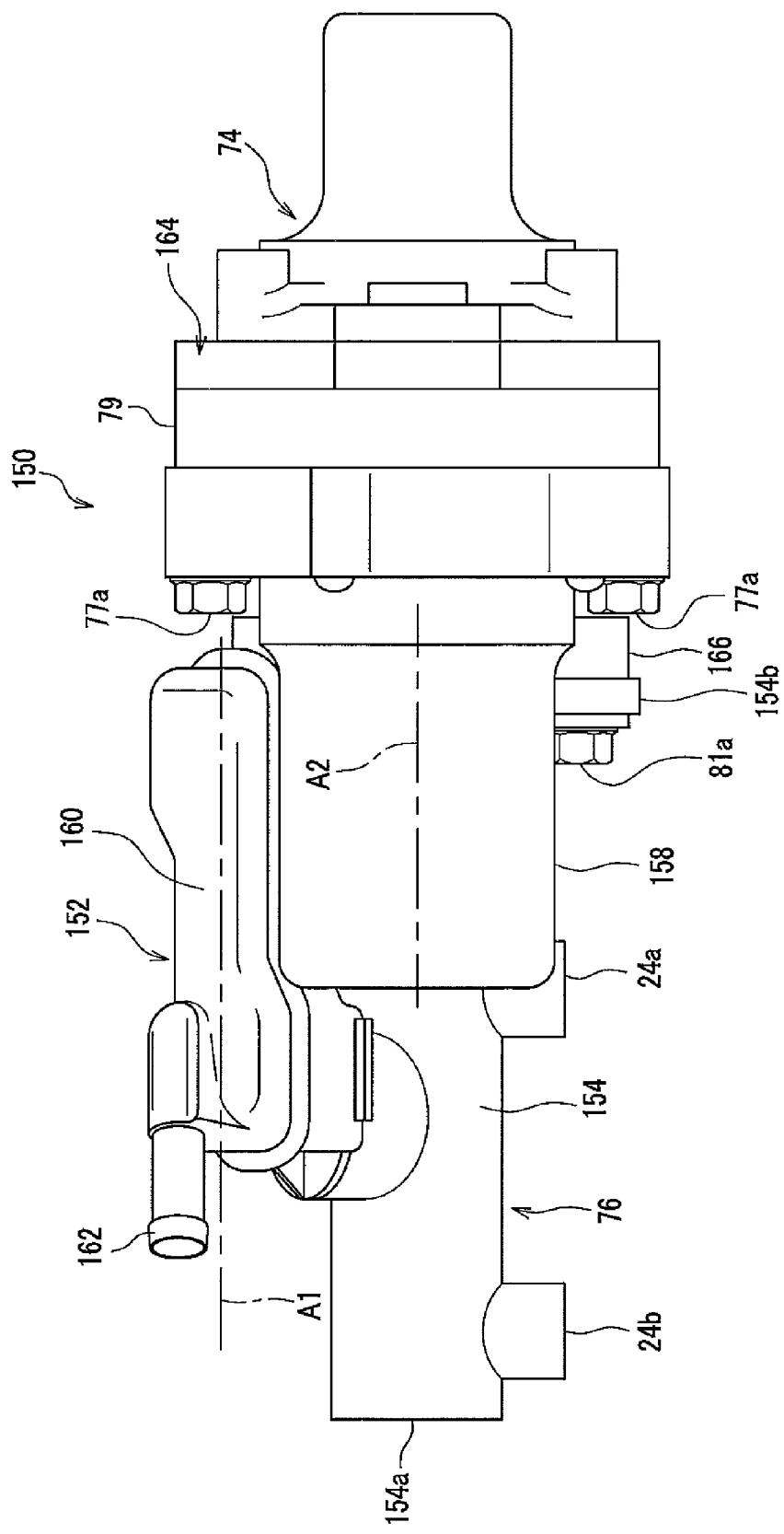
FIG. 7 is a plan view of the motor cylinder apparatus illustrated in FIG. 6.
Figure 8:
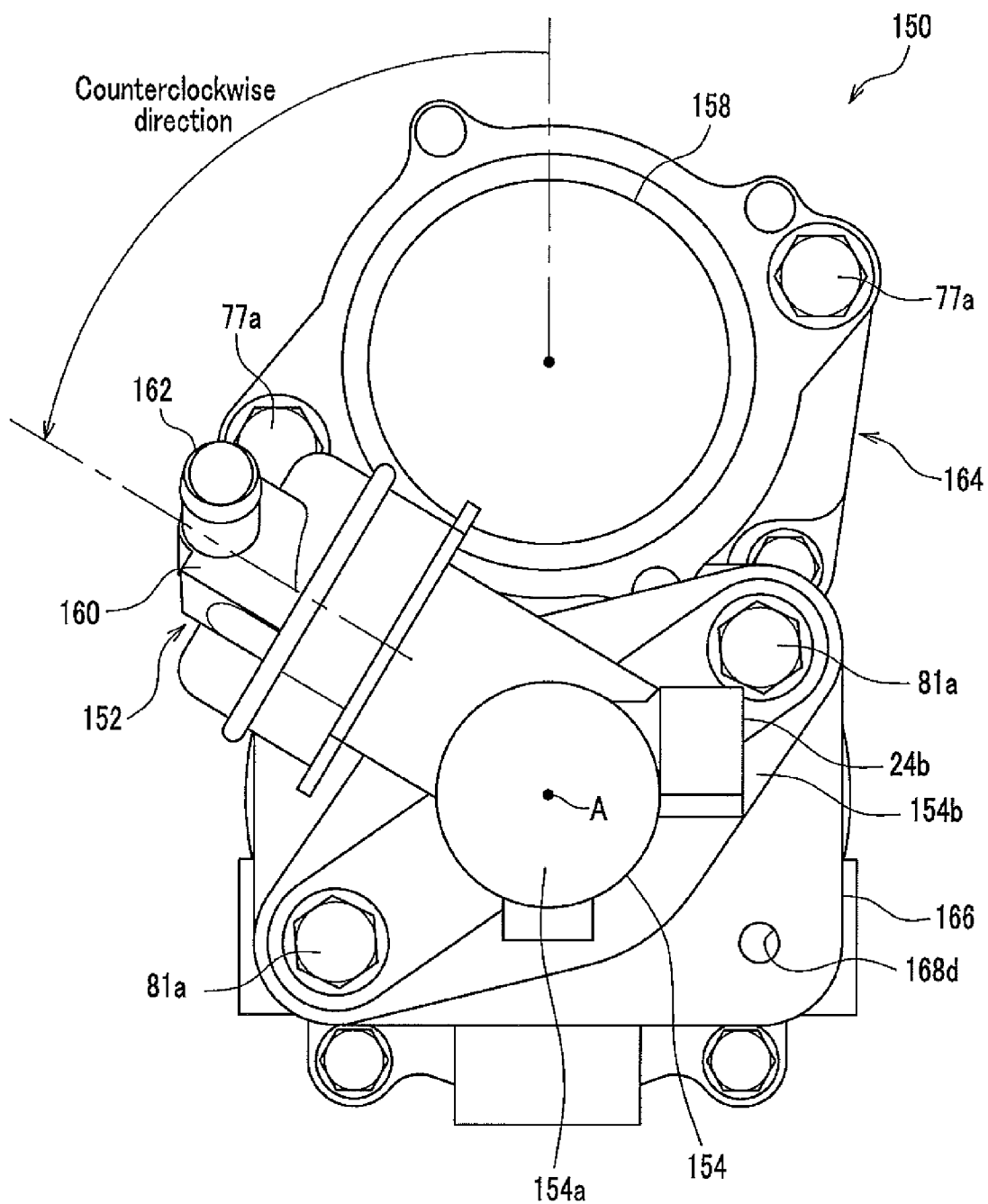
FIG. 8 is a front view of the motor cylinder apparatus of in FIG. 6 in which a reservoir is in a first inclined arrangement.
Figure 9:
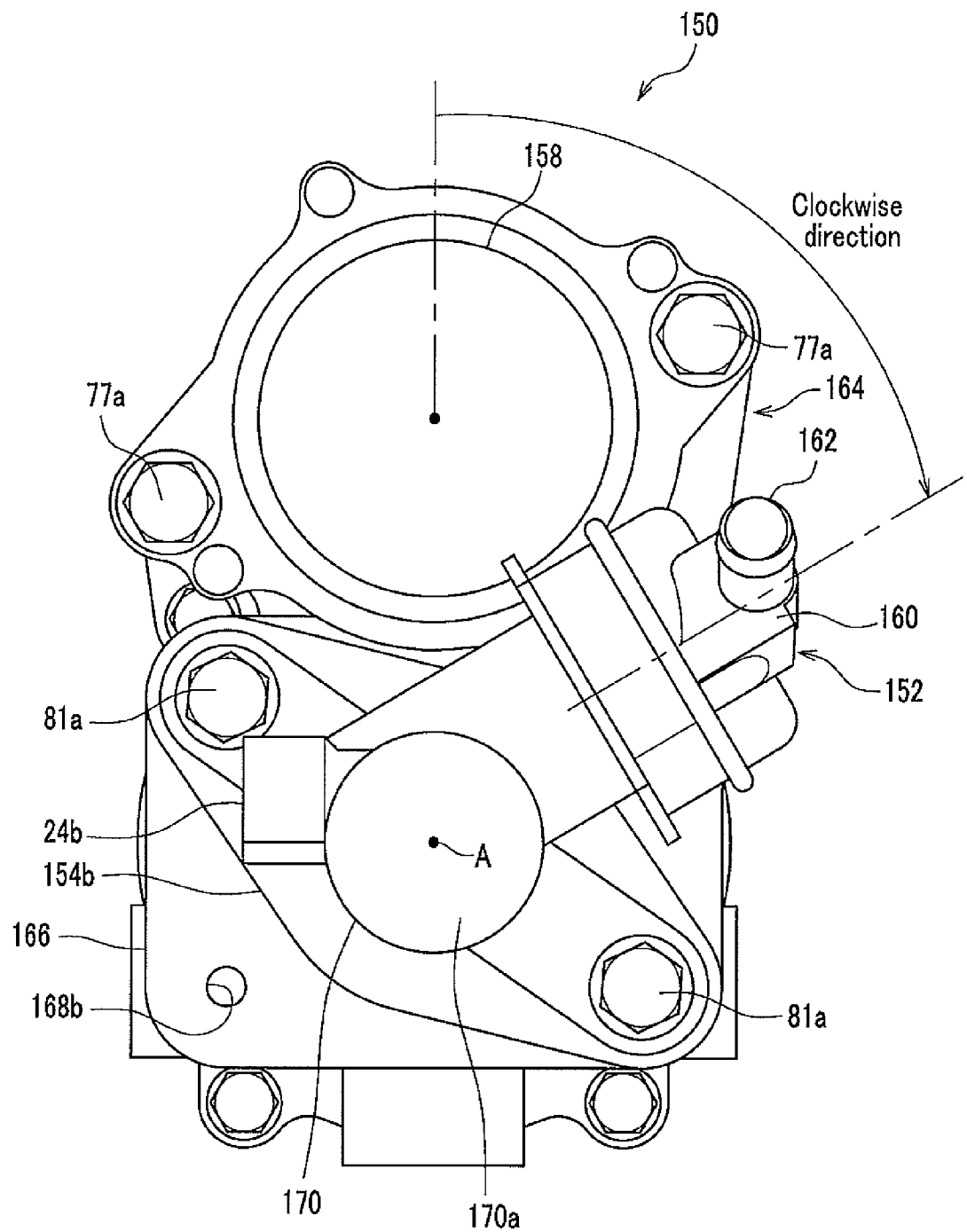
FIG. 9 is a front view of the motor cylinder apparatus of FIG. 6 in which the reservoir is in a second inclined arrangement symmetrical to the first inclined arrangement.
Figure 10:
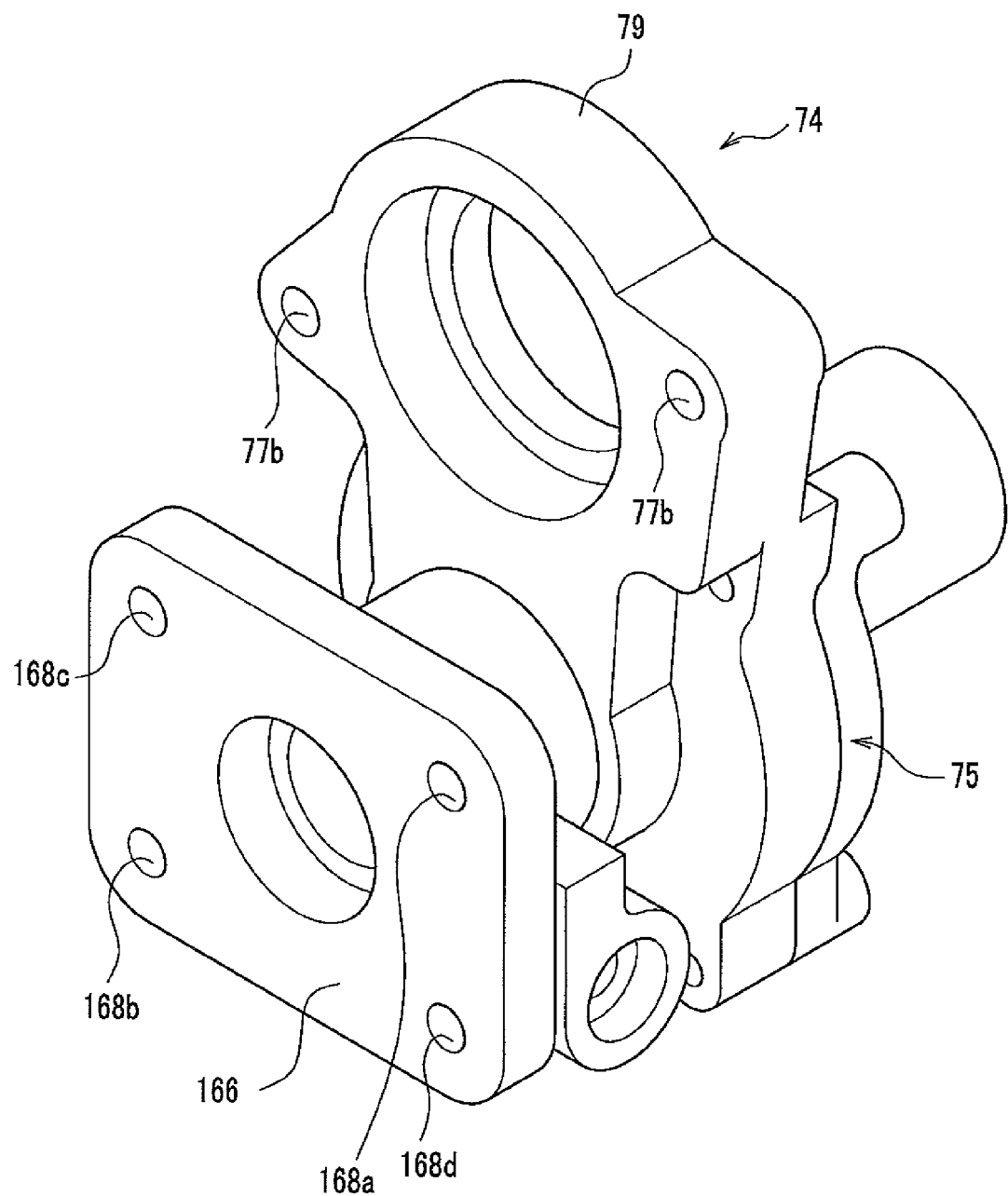
FIG. 10 is a perspective view of an actuator housing, where the arrangement of screw holes in a flange is indicated.

FIG. 6 is a perspective view of a motor cylinder apparatus according to a second embodiment of the present invention, FIG. 7 is a plan view of the motor cylinder apparatus illustrated in FIG. 6, FIG. 8 is a front view of the motor cylinder apparatus of in FIG. 6 in which a reservoir is in a first inclined arrangement, FIG. 9 is a front view of the motor cylinder apparatus of FIG. 6 in which the reservoir is in a second inclined arrangement symmetrical to the first inclined arrangement, and FIG. 10 is a perspective view of an actuator housing, where the arrangement of screw holes in a flange is indicated.

As illustrated in FIG. 6, the motor cylinder apparatus 150 has the cylinder body 154, and the second reservoir 152 is directly attached to the cylinder body 154. The second reservoir 152 has a reservoir body 160. As illustrated in FIG. 7, the reservoir body 160 has an elongated shape, and extends from a reservoir port 156 toward the electric motor 158. A nipple 162 is arranged on the reservoir body 160. The nipple 162 externally protrudes from the reservoir body 160, and extends approximately parallel to the axis of the reservoir body 160 in the direction toward an end 154a of the cylinder body 154 as illustrated in FIG. 7. The second reservoir 152 performs the function of the aforementioned reservoir in the electric brake actuators according to the first and second aspects of the present invention.

The cylinder body 154, which constitutes the main body of the electric brake actuator, is attached to an actuator housing 164 by screw fastening, and can be detached from the actuator housing 164. The actuator housing 164 includes a flange 166 having an approximately rectangular shape in a side view. The other end 154b of the cylinder body 154 is attached to the flange 166 by screw fastening. The flange 166 has four screw holes 168a to 168d at four near-corner positions of the flange 166 as illustrated in FIG. 10. The screw holes 168a to 168d allow screw fastening with a pair of screw members 81a.

Specifically, the cylinder body 154 can be attached to the actuator housing 164 by screw fastening at two screw holes 168a and 168b with the pair of screw members 81a, where the screw holes 168a and 168b are located at diagonally opposite positions in the flange 166. In this case, as illustrated in FIG. 8, the second reservoir 152 is in the first inclined arrangement in which the second reservoir 152 is rotated anticlockwise around the axis A of the cylinder body 154 by a predetermined angle. At this time, the other screw holes 168c and 168d which are not used in the above first inclined arrangement are left exposed externally.

Alternatively, the cylinder body 154 can be attached to the actuator housing 164 by screw fastening at the other screw holes 168c and 168d with the pair of screw members 81a, where the screw holes 168c and 168d are located at diagonally opposite positions in the flange 166. In this case, as illustrated in FIG. 9, the second reservoir 152 is in the second inclined arrangement in which the second reservoir 152 is rotated clockwise around the axis A of the cylinder body 170 by a predetermined angle. The cylinder body 170 is different in shape from the cylinder body 154. The motor cylinder apparatus illustrated in FIG. 9 is different from the motor cylinder apparatus illustrated in FIG. 8 only in the shape of the cylinder body and the inclined arrangement of the second reservoir 152. The actuator housing 164 can be used in common in the first and second inclined arrangements.

According to the second embodiment, the second reservoir 152 can be arranged in a plurality of rotational positions around the axis of the cylinder body 154 or 170. The arrangements illustrated in FIGS. 8 and 9 are examples of the plurality of rotational positions. As explained above, in the examples illustrated in FIGS. 8 and 9, the second reservoir 152 can be arranged in one of the two approximately symmetrical rotational positions (which are the positions rotated anticlockwise and clockwise around the axis of the cylinder body 154 or 170, respectively) by arranging the four screw holes at the four near-corner positions of the rectangular flange 166.

The plurality of rotational positions can be realized as needed by appropriately setting the shape of the flange 166 and the number and arrangement of screw holes in the flange 166. Therefore, the cylinder body 154 or 170 can be attached to the actuator housing 164 at an arbitrary rotational position around the axis A of the cylinder body 154 or 170.

According to the second embodiment, the axis of the second reservoir 152 is parallel to the axis of the electric motor 158, and apart from the axis of the electric motor 158 by a predetermined distance in a plan view as illustrated in FIG. 7. Therefore, it is possible to effectively use the space in such a manner that the second reservoir 152 and the electric motor 158 do not interfere with each other.

Therefore, according to the second embodiment, a relatively large electric motor having a greater length in the axis direction than the electric motor 72 illustrated in FIG. 3 can be used as the electric motor 158. In addition, a reservoir having a greater length in the axis direction than the second reservoir 84 illustrated in FIG. 4 can be used as the second reservoir 152. In this case, since the size of the reservoir body 160 in the second reservoir 152 can be increased, it is possible to increase the capacity of the brake fluid reserved in the second reservoir 152. Further, it is also possible to increase the support stiffness of the second reservoir 152. Furthermore, as in the first embodiment illustrated in FIGS. 1 to 5, the second reservoir 152 may be inclined from the axis A. In this case, the motor cylinder apparatus 150 can be mounted on the vehicle body in such a manner that the nipple 162 is located on the top of the second reservoir 152.

Since, according to the second embodiment, the cylinder body 154 or 170 can be attached to the actuator housing 164 at an arbitrary rotational position around the axis A of the cylinder body 154 or 170 as explained above, it is possible to increase the degree of freedom in layout. For example, the motor cylinder apparatus 150 can preferably cope with either of the left-hand drive arrangement and the right-hand drive arrangement of the vehicle, and improves the assemblability.

According to the present invention, electric brake actuators and vehicle brake systems having increased versatility can be provided.

What is claimed is:

1. An electric brake actuator for generating hydraulic brake pressure based on at least an electric signal corresponding to manipulation of a brake input apparatus by an operator, the brake input apparatus is incorporated in a vehicle brake system and is arranged separately from the electric brake actuator for receiving the operator's manipulation, the electric brake actuator comprising:
a main body including a cylinder body; and
a reservoir attached to the cylinder body and reserving brake fluid;
wherein the reservoir and the cylinder body are configured so that the reservoir is selectively attachable to different portions of the cylinder body at predetermined rotational positions around the axis of the cylinder body.

2. The electric brake actuator according to claim 1, wherein the reservoir has a nipple attached thereto and through which the reservoir fluidly communicates with the vehicle brake system, and the reservoir is attached to the cylinder body such that the nipple is located on an outer surface of the reservoir spaced away from the cylinder body.

3. The electric brake actuator according to claim 1, wherein the main body of the electric brake actuator further includes an actuator housing which is detachably attached to the cylinder body, and the actuator housing and the cylinder body are configured so that the cylinder body is selectively attachable to different portions of the actuator housing at a plurality of rotational positions around the axis of the cylinder body.

4. The electric brake actuator according to claim 3, wherein the reservoir has a nipple attached thereto and through which the reservoir fluidly communicates with the vehicle brake system, and the reservoir is attached to the cylinder body such that the nipple is located on an outer surface of the reservoir spaced away from the cylinder body.

5. The electric brake actuator according to claim 1, wherein the different portions of the cylinder body include two portions arranged at two approximately symmetrical rotational positions on the cylinder body.

* * * * *